Oct. 25, 1927.  
F. B. MARSHALL  
1,646,621  
SUNSHADE FOR AUTOMOBILE WINDOWS  
Filed Nov. 15, 1926
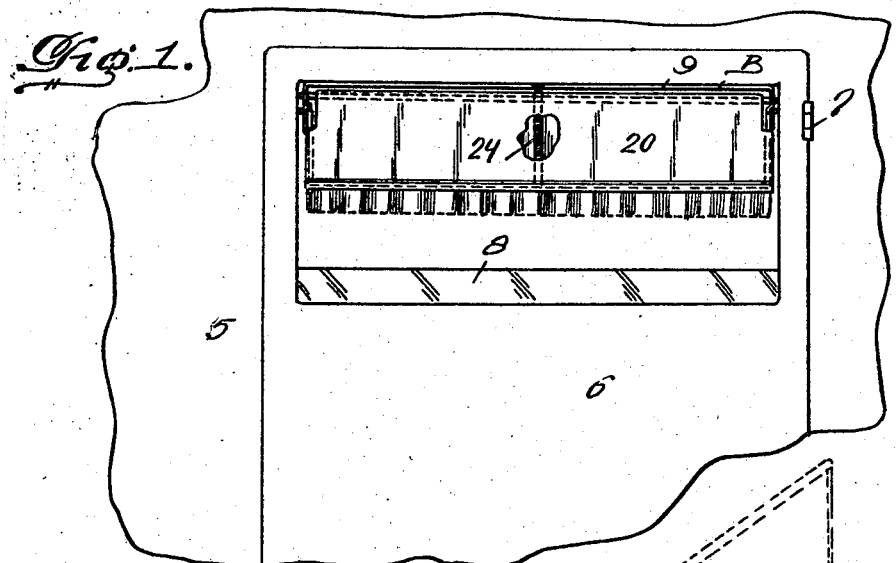
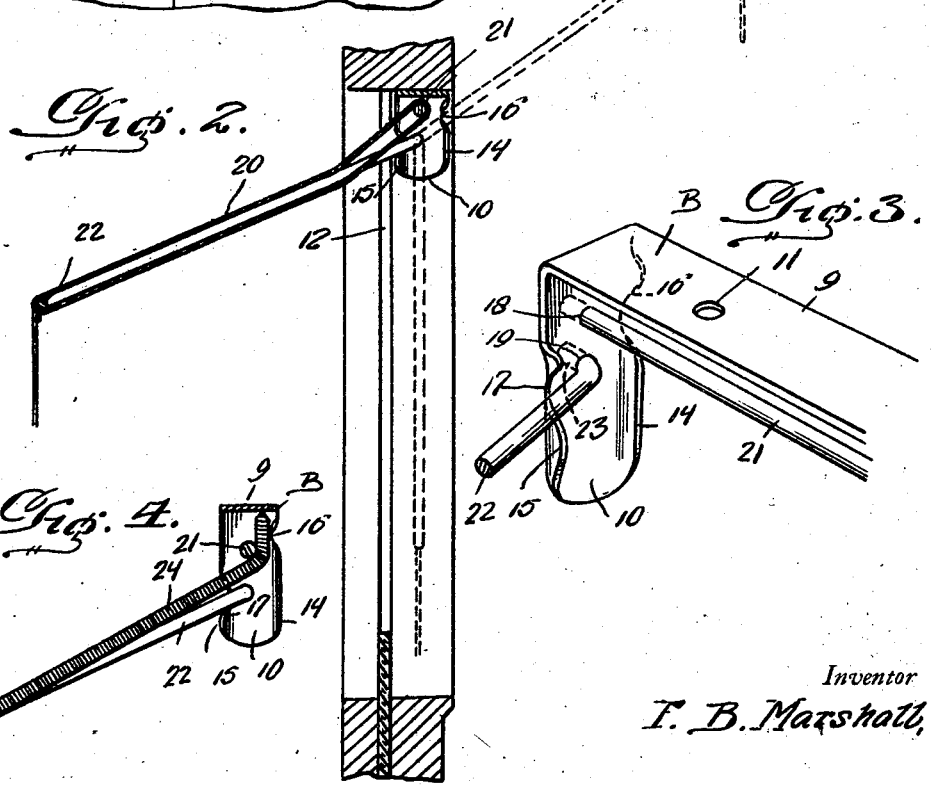
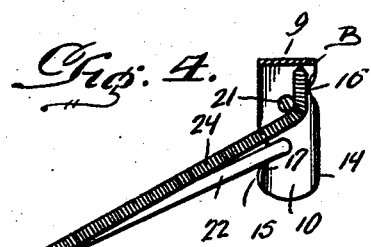
Inventor  
F. B. Marshall,
By Clarence A. O'Brien  
Attorney Patented Oct. 25, 1927.

1,646,621

UNITED STATES PATENT OFFICE.

FRANK B. MARSHALL, OF KINSLEY, KANSAS.

SUNSHADE FOR AUTOMOBILE WINDOWS.

Application filed November 15, 1926. Serial No. 148,470.

The present invention relates to a sunshade adapted particularly for use upon the closed type of automobiles now in common use and aims to provide an exceedingly simple and handy structure which is capable of being extended outwardly from the top of an automobile window to slant downwardly so as to shade the occupants of the automobile from the sun glare and to also permit the lowering of the window in inclement weather.

Another very important object of the invention lies in the provision of a structure of this nature which is inexpensive to manufacture and instal and yet will prove thoroughly reliable and efficient in use.

With the above and numerous other objects in view as will appear as the description proceeds, the invention resides in certain novel features of construction, and in the combination and arrangement of parts as will be hereinafter more fully described and claimed.

In the drawing:

Figure 1 is an outside elevation of a portion of an automobile closed body showing my improved sunshade associated with the window of one door, Fig. 2 is an enlarged vertical section therethrough, Fig. 3 is a detail perspective view showing one end of the bracket, Fig. 4 is a transverse vertical section through the bracket and the shade frame, Referring to the drawing in detail it will be seen that the numeral 5 denotes generally one side of a closed body of an automobile having mounted therein a door 6 hinged as at 7. The numeral 8 denotes the window which may be raised and lowered in the usual well known or any preferred manner. The parts thus far described are all conventional and well known in the art and are illustrated herewith merely by way of example to exemplify a practical use of my improved shade structure. These conventional details, therefore, are not of the essence of my invention.

The letter B denotes generally a bracket which is of a substantially inverted U-shaped formation to include an elongated bar 9 forming the bight and depending in arms 10. The bar 9 may be apertured as at 11 in order that suitable fastening elements such as screws or the like may be utilized in mounting this bracket bar in the upper side of the window opening such as illustrated clearly in Figs. 1 and 2 so that the arms 10 extend downwardly along the vertical sides of the opening. It is to be noted that the bracket B is preferably located to the inside of the guide channels 12 for the window 8. Each depending arm 12 has portions of its side edges bent laterally and inwardly to form side flanges 14 and 15 the former being to the inside of the body of the automobile and the latter being to the outside of the body of the automobile. The flange 14 is formed with a notch 16 by bending a portion of the flange to one side. The flange 15 is formed with a notch 17 at a lower level than notch 16 but bending a portion of the flange 15 laterally. Each arm 10 is provided with two apertures 18 and 19 the former above the latter.

The shade proper is denoted by the numeral 20 and may be formed of canvas or some other similar material. This shade 20 is preferably constructed two ply as is clearly illustrated in Fig. 2. A rod 21 extends between the plies in the upper edge of the shade and extends into the openings 18. A U-shaped frame member 22 has its bight portion extending between the plies of the shade adjacent the lower longitudinal edge and its side legs extending along the end edges and its extremities bent outwardly as at 23 to be journaled in the openings 19. An expansible coil spring 24 is attached to the center of the bar 9 and to the center of the bight of the U-shaped frame member 22.

From the detailed description of the parts as given above it will be readily seen that the shade may be swung to the full line position shown in Fig. 2 at which time the legs of the U-shaped frame 22 are engaged in the notches 17 of the flanges 15 or to the dotted line position shown in Fig. 2 at the center at which time the shade is vertical or again to the dotted line position shown to the right of Fig. 2 at which time the legs of the U-shaped frame are engaged to the notches 16 of the flanges 14. In the two dotted line positions shown in Fig. 2 it is clear that the window 8 may be raised and lowered without interference. When the shade is in the full line position of Fig. 2 the window may be practically closed or it may be lowered so as to allow the desirable ventilation and the shade will keep out the sun rays and will also keep out rain.

It is thought that the construction, utility, operation, and advantages of the invention will now be clearly understood by those skilled in this art without a more detailed description thereof.

The present embodiment of the invention has been disclosed in detail merely by way of example since in actual practice it attains the features of advantage enumerated as desirable in the statement of the invention and the above description. It will be apparent that the changes in the details of construction, and in the arrangement and combination of parts may be resorted to without departing from the spirit or scope of the invention as hereinafter claimed or sacrificing any of its advantages.

Having thus described my invention what I claim as new is:

1. A device of the class described comprising a shade frame member, outwardly disposed extensions on the frame member a bracket bar having depending arms disposed in spaced relation, each arm being provided with an opening, one or both of said arms having side edges bent laterally to form side flanges, said flanges being bent to form notches, said extensions being journalled in said openings, and said frame member being engageable with the said notches.

2. A device of the class described comprising a shade frame member, outwardly disposed extensions on the frame member, a bracket bar having depending arms one at each end, each arm being provided with an opening, and having its side edges bent inwardly to form a pair of side flanges, the flanges of each arm being bent outwardly to form notches, the extensions of the frame member being journalled in the openings, said frame member being engageable in the notches, a rod mounted between the arms, and a spring of the expansible coil type having one end engaged with the rod and the other end engaged with the frame member.

In testimony whereof I affix my signature.

FRANK B. MARSHALL.